March 9, 1943.    P. MAINARDI ET AL    2,313,562
STEREOSCOPE
Filed May 22, 1941
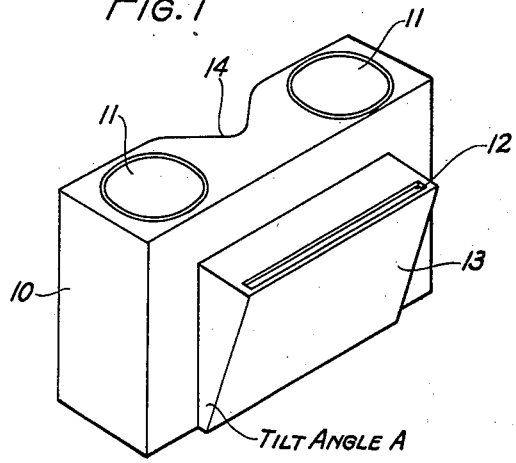
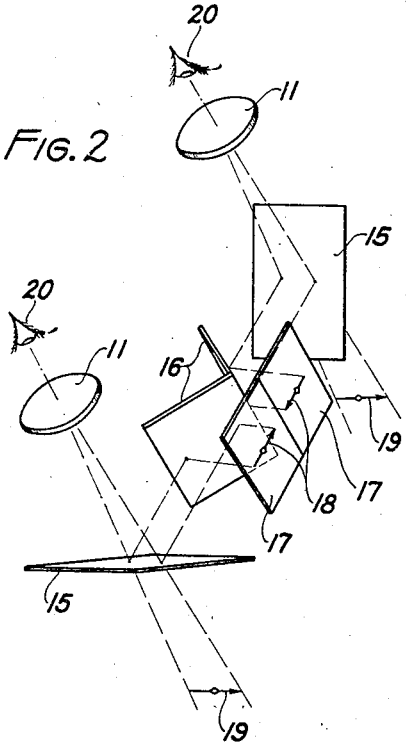
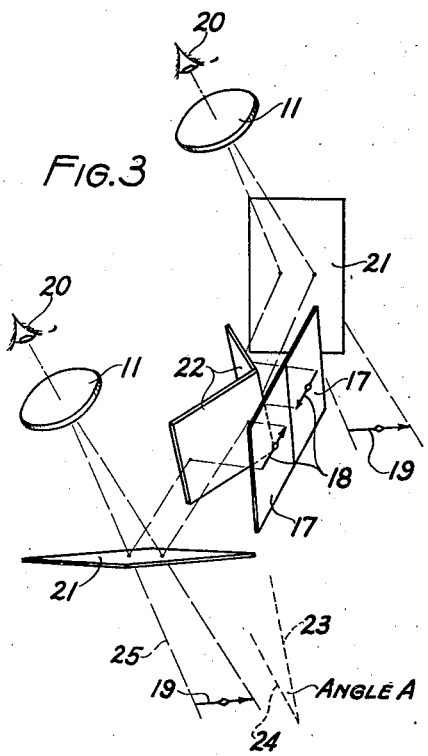
POMPEY MAINARDI
MARCUS N. MAINARDI
INVENTORS
BY
ATTORNEY Patented Mar. 9, 1943

2,313,562

UNITED STATES PATENT OFFICE 2,313,562

STEREOSCOPE

Pompey Mainardi and Marcus N. Mainardi, Paterson, N. J.

Application May 22, 1941, Serial No. 394,678

6 Claims. (Cl. 88—29)

This invention relates to stereoscopes and has for its main object the viewing of stereoscopic pictures oppositiaxially oriented adjacent to one another on a film.

Such stereoscopic pictures are taken by the optical systems described in our copending applications, Serial Numbers 394,676 and 394,677 filed concurrently herewith. Oppositiaxial pictures are those having their axes oppositely arranged, i. e. head-to-head or foot-to-foot.

It is an object of the invention to provide such a stereoscope which is simple and convenient to use. It is also an object of the invention to provide such a stereoscope in which the viewing lenses have approximately the same focal length as the lens or lenses with which the pictures were taken. This enhances the stereoscopic effect, since it provides the one viewing the pictures with the same perspective as the camera had when taking the pictures.

It is the principal object of the preferred embodiment of the invention to provide a stereoscope of the above-described type in which there is sufficient nose room so that the pictures may be conveniently viewed.

According to the invention, the stereoscope consists of a box or housing having a front window with grooves in the side thereof into which the slide carrying the pictures on a transparency may be slipped. In a preferred embodiment of the invention, a diffusing medium such as a ground glass is provided in front of the window so that the light reaching the transparency will be uniform. In the top wall of the housing, separated by the interocular distance, there are provided two oculars which may be focusable to accommodate the eyes and may even have their separation adjustable to accommodate observers having different interocular distances. When a stereoscopic film having the pictures adjacent to one another and head-to-head (i. e. oppositiaxially oriented) is placed in the front window of the housing, the light passing through each picture strikes a mirror and is reflected outward to a second mirror by which it is reflected upward to the ocular. This arrangement of mirrors rotates the light beam through 90°. Since the two beams corresponding to the two pictures strike oppositely arranged systems of mirrors this rotation is in the opposite direction and hence both pictures appear upright and similarly oriented when viewed through the oculars.

Of course, there are numerous arrangements of two mirrors such as used in each half of this stereoscope which will provide the required 90-degree rotation of the beam. With the simple arrangement whereby the light enters the stereoscope horizontally, is reflected from the first mirror horizontally and is then reflected vertically upward, the first two mirrors have a tendency to interfere with the nose of the one using the stereoscope, especially when the oculars are of short focal length and wide covering power. Therefore, according to a preferred embodiment of the invention, the means for holding the film in the front window of the camera is tilted forward at a small acute angle, preferably between 5° and 25° and the mirrors are adjusted to give the desired rotation and direction to the reflected beams. Since many miniature cameras now use lenses of about 50-mm. focal length, it is desirable for proper perspective, to have the oculars also of about 50-mm. focal length. With this arrangement, it is convenient to have the film holding means tipped forward at an angle equal to about 12°.

Throughout this description, the terms horizontal and vertical, top, bottom, front, back, etc., are all used relatively and do not necessarily refer to any absolute orientation in space.

The invention will be fully understood from the following description when read in connection with the accompanying drawing, in which:

Fig. 1 is a perspective view of a stereoscope incorporating a preferred embodiment of the present invention.

Fig. 2 illustrates in perspective the optical system of the present invention.

Fig. 3 shows the optical system corresponding to Fig. 1.

In Fig. 1, the stereoscope is provided with a housing 10 having oculars 11 in the top wall thereof. In the front wall, there is provided a slot 12 into which a slide carrying stereoscopic pictures adjacent to one another and oppositiaxially oriented on a film may be dropped. This front wall is provided with a diffusing medium 13 such as a ground glass so that the slide when placed in the slot 12 will be uniformly illuminated. In the arrangement shown, this slot 12 is tilted at an angle A to the optic axis of the oculars 11. Part of the rear wall of the housing 10 is cut away as shown by the recess 14 to provide nose room.

In Fig. 2 the optical system is shown in which the film 17 carrying stereoscopic images 18 is arranged vertically and the light passing therethrough forms a horizontal beam which is reflected horizontally at right angles thereto by mirrors 16. The outgoing beams strike mirrors 15 which reflect them vertically through the oculars 11 to the eyes 20 of the observer. Such an orientation of the mirrors 15 and 16 rotates each of the beams through 90° and in opposite directions, so that the images 18 appear as shown by the arrows 19 to be similarly oriented and upright, when viewed through the oculars 11.

However, the mirrors 15 and 16 may be tipped at various angles and still give the desired 90-degree rotation. This is well known to anyone who has manipulated any two-mirror system.

In Fig. 3 the film 17 is tipped forward at an angle A. This is shown by the broken lines 23 and 24, the broken line 23 being in the same plane as the pictures 17 and the broken line 24 being parallel to the optic axes 25 of the oculars 11. In this case, the mirrors 21 and 22 are oriented slightly differently from the mirrors 15 and 16 of Fig. 2, but the difference is very slight as shown. In practice the adjustment even of the mirror 15 is made by viewing through the oculars 11 and moving the mirror until it presents the upright image required. A similar manipulation of the mirror 21 automatically takes care of the slight difference in the orientation between this mirror 21 and the mirror 15. Of course, the relationship between the angle A and the orientation of the mirror 21 could be computed mathematically, but is relatively so involved as to be less practical than the simple direct method of making an adjustment at the time the system is assembled. This is particularly true since such an adjustment would probably be necessary anyway. This angle A is preferably between 5° and 25°, most preferably about 12° when 50-mm. focal length lenses are used.

Having thus described the preferred embodiments of our invention, we wish to point out that it is not limited to these specific structures but is of the scope of the appended claims.

What we claim and desire to secure by Letters Patent of the United States is:

1. A device for viewing stereoscopic pictures adjacent to one another and oppositiaxially oriented on a film comprising a housing having a front window, two oculars mounted in the top wall of the housing and separated by the interocular distance, means for holding the film symmetrically in the front window with the line of division between the pictures approximately vertical, a first reflector behind each half of the window to reflect a light beam passing through the window outward to the side and a second reflector below each ocular to receive the beam and reflect it upward to the ocular, the mirrors being oriented to rotate the beams oppositely through 90° whereby oppositiaxially images on the film plane appear similarly oriented in the oculars.

2. A device according to claim 1 in which a light diffusing sheet is mounted in the front window in front of the film holding means.

3. A device according to claim 1 in which the film holding means is tipped forward at a small acute angle to the vertical to give increased nose room between the oculars.

4. A device according to claim 1 in which the film holding means is tipped forward at an angle between 5° and 25° to give increased nose room between the oculars.

5. A device according to claim 1 in which the film holding means is tipped forward at an angle equal to about 12°.

6. A device according to claim 1 for viewing stereo pictures made with a lens whose focal length is about 50-mm. in which device the oculars have a focal length of approximately 50-mm.

POMPEY MAINARDI.
MARCUS N. MAINARDI.